United States Patent [19]

Malminen

[11] Patent Number: 5,515,734

[45] Date of Patent: May 14, 1996

[54] VARIABLE AREA FLOW METER

[76] Inventor: Kari Malminen, 1900 Glenn Club Dr., Apt. 1319, Stone Mountain, Ga. 30087

[21] Appl. No.: 370,849

[22] Filed: Jan. 10, 1995

[51] Int. Cl.$^6$ ................................................. G01F 1/37
[52] U.S. Cl. .................................. 73/861.46; 73/861.47
[58] Field of Search .......................... 73/861.46, 861.47, 73/861.45, 861.48, 861.71

[56] References Cited

U.S. PATENT DOCUMENTS

| | | | |
|---|---|---|---|
| 2,377,861 | 6/1945 | Brewer | 73/209 |
| 3,805,611 | 4/1974 | Hedland | 73/209 |
| 4,389,901 | 6/1983 | Lake | 73/861.58 |
| 4,945,771 | 8/1990 | Ogden | 73/861.58 |
| 5,086,654 | 2/1992 | Malminen | 73/861.58 |
| 5,317,930 | 6/1994 | Wedding | 73/863.03 |

FOREIGN PATENT DOCUMENTS 53042  5/1982  Finland .
687835  3/1965  Italy .

*Primary Examiner*—Richard Chilcot
*Assistant Examiner*—Max Noori
*Attorney, Agent, or Firm*—Hopkins & Thomas

[57] ABSTRACT

A variable area flow meter (10) for monitoring the rate of flow of a cooling and lubricating fluid medium about a pump seal, having a transparent flow tube (27) through which the fluid flows. An indicating and cleaning assembly (40) is mounted within the flow tube (27) and supports a spring by its float (56) that is movable back and forth along the length of the flow tube (27). A cleaning member (51) is affixed to the distal end (48) of a longitudinally extending shaft (46) of the indicating and cleaning assembly (40) and is tight frictional contact with the inner wall (28) of the flow tube (27). The float (56) and cleaning member (51) engage and scrape the inner side wall (28) of the flow tube (27) during a cleaning operation to remove any accumulated dirt and debris from the inner side wall (28) of the flow tube (27).

14 Claims, 2 Drawing Sheets

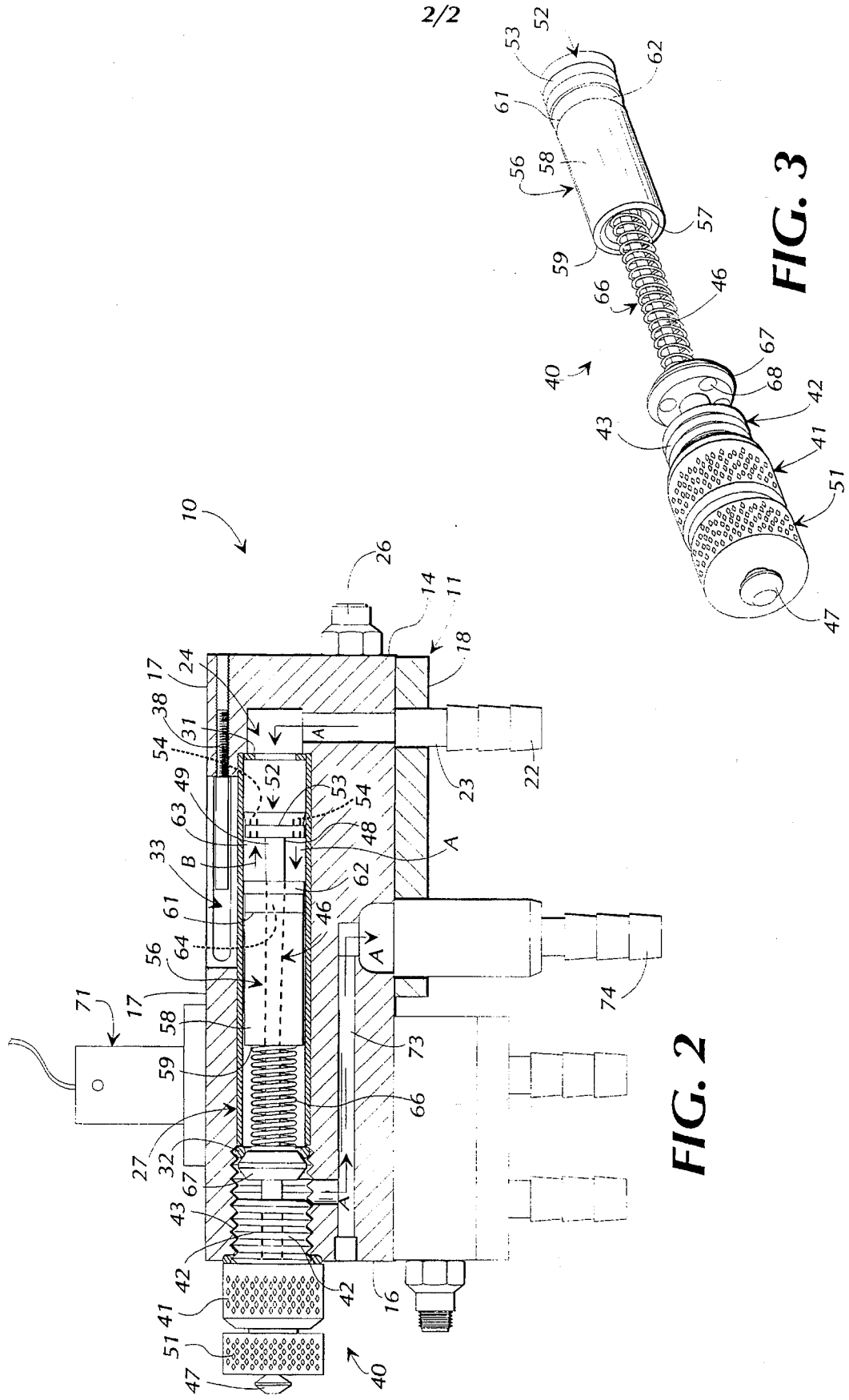

VARIABLE AREA FLOW METER

FIELD OF THE INVENTION

The present invention relates generally to flow meters for measuring the rate of flow of a fluid medium. In particular, the present invention relates to a variable area flow meter having means for clearing from the flow tube of the flow meter dirt and debris that has accumulated in the flow tube as a result of the passage of a fluid medium therethrough, without substantially disrupting the flow or the pressure of the fluid medium through the flow meter.

BACKGROUND OF THE INVENTION

In many manufacturing plants or other facilities, such as papermills, where large pumps are run continuously to convey a process liquid for a mixing process, cooling and lubricating mediums such as water or oil often are used to cool and lubricate the seals or bearings surrounding the drive shafts of the pumps. The heat generated due to friction between the drive shaft and the sides of the impeller housing and the high temperature to which the process liquid is generally heated can cause the failure of the seals or bearings, which can result in expensive pump down time.

When the seal fails, the process liquid can leak out of the apparatus or the cooling water will leak in, mixing with and contaminating the process liquid. Such leaks waste water and waste energy as the mixing of cooling water with the process liquid lowers the temperature of the process liquid, requiring additional energy and thus additional expense to maintain the temperature of the process liquid at the proper processing level. It therefore is highly desirable to detect a breach of the seal of a pump as early as possible so that the seal can be repaired or replaced, thereby restoring the efficiency of the process and prolonging the life of the seal.

In general, flow meters are used to monitor and regulate flow of a fluid medium such as sealing water about a pump seal. Flow meters measure the pressure and rate of flow of the sealing water thereby to provide an indication of the integrity of the pump seal. If the flow increases and pressure drops, it is an indication of a leak of the process liquid out of the process. If the flow drops and the pressure rises, it is an indication that the sealing water is leaking into the process liquid. Thus, flow meters provide an indication of the incipient failure of the pump seal. In general, there are several types of flow meters used to measure the flow amount of liquids or gasses depending on the application. Typically, most conventional flow meters have a conical metering channel into which the liquid flows from the narrow end of the cone and leaves at the broader end of the cone, and a float mounted in the cone. The position of the float changes in accordance with the volume of the flow through the metering channel and provides an indication as to the flow volume. Other types of conventional flow meters include a cylindrical metering channel having a float located therein indicating the volume of flow through the metering channel.

The main problem that occurs with most conventional flow meters is that over time the readability of the meter becomes diminished by collected dirt and debris. The water used to cool and lubricate pump seals in most processing plants is generally waste water which has a considerable amount of dirt and other impurities. This dirt and grime tends to accumulate within the flow tube of the flow meter. The accumulation of dirt consequently clouds the flow tube and restricts the flow through the flow tube, making it difficult for the float to move to the correct indicator point and making it difficult to read and take accurate measurements of the rate of the flow through the system.

Accordingly, flow meters having a cleaning function for cleaning the flow tube thereof have been developed. Such flow meters generally include a movable float mounted on a conically shaped rod extending along the length of the flow tube. However, the cleaning function of these conventional flow meters generally is limited only to a section or portion of the flow tube between the zero indicator and the float which gives the current flow indication. Consequently, there is a portion of the flow tube from which accumulated dirt and grime is not cleaned.

For example, Finnish Patent No. 53042 discloses a conventional flow meter having a conical flow tube or channel that includes a brush positioned below the float tube and which is moveable along a portion of the length of the flow tube between the inlet end and the float thereon. The use of this brush to clean the flow tube is, however, somewhat inefficient as the brush must be turned as it is moved along the length of the flow tube for proper cleaning of the flow tube, and the brush is prevented from reaching the upper regions of the flow tube by the position of the float on top of the brush. Further, with the brush in its cleaning position, the flow of liquid through the flow tube is substantially disrupted, so that the flow meter cannot function to indicate the volume of flow of the liquid through the meter during cleaning. Additionally, Finnish Patent No. 61759 discloses a variable area flow meter having a cleaning function that is accomplished by the momentary reversal of the direction of the flow of the liquid through the flow meter so as to move the float from the metering position to a zero position and back as the normal flow resumes. The problem with such device is that the movement of the float only cleans that part of the flow tube that is between the measured position of the float and the zero value. As a result, the remainder of the flow tube will remain cloudy and will continue to accumulate dirt and grime to the point where the flow tube will become unusable and thus will destroy the function of the flow meter, requiring the flow meter to be disassembled and cleaned.

An additional problem that is common to conventional flow meters is that during the cleaning operation the flow of the liquid through the flow meter either must be completely stopped or is substantially disrupted, as taught by Finnish Patent No. 61759, by a reversal of the flow or the insertion of a brush that engages the sides of the flow meter. Such disturbances in the flow of the liquid through the flow meter has serious consequences for the equipment being cooled by the liquid flowing through the flow meter, possibly leading to damage and failure of such equipment due to a disruption in the flow of cooling water to the seals thereof.

Additionally, many conventional flow meters now are equipped with low flow alarms that are triggered if the flow decreases under a preset limit. Generally, such alarms are connected to the process control system so that when the alarm is triggered, the entire process is shut down. As a consequence, when conventional flow meters, such as those discussed above, are cleaned, the floats tend to move past the lower limit set point of the alarms triggering the alarm and shutting down the system. To avoid false alarms, such as when the flow meter is being cleaned, the control systems for such flow meters require a delay or bypass circuit that will switch on while cleaning. However, in spite of such delays and spite of these delay circuits, false alarms still occur frequently as sometimes it is necessary to perform multiple cleaning operations to substantially completely clean the flow meter of accumulated dirt and grime therein. Thus, the cleaning function performed by conventional flow meters generally is incomplete and causes disruptions in the system that can lead to system shutdown or other problems.

Therefore, it can be seen that a need exists for a variable area flow meter which has a self-cleaning function that quickly and completely cleans the flow tube thereof of any accumulated dirt and debris without substantially disrupting the flow of the fluid medium therethrough. Accordingly, it is the provision of a flow meter with an improved self cleaning function to which the present invention is primarily directed.

SUMMARY OF THE INVENTION

Briefly described, the present invention comprises a variable area flow meter to be used as part of a regulation and maintenance system for measuring the rate of flow of a fluid medium. In a preferred from of the invention, the flow meter includes a housing having integrally formed therein a flow channel or passage extending through the housing and communicating with an inlet channel and an outlet channel. The inlet channel delivers a flow of the fluid medium into the housing while the outlet channel provides a means for permitting the fluid to flow from the housing.

A transparent flow tube is mounted in the housing along the flow path of the medium. A scale is printed on the flow tube to provide a gauge for measuring the flow rate of the fluid through the flow meter. An adjustable set point indicator mounted within the housing, positioned above and parallel to the flow tube, extending partially along the length of the flow tube. The set point indicator provides a visual indication of whether the desired volume of flow through the flow meter is being met.

An indicating and cleaning assembly is inserted into and extends along the flow channel, received within the flow tube, for cleaning the flow tube of accumulated dirt and grime. The indicating and cleaning assembly includes a metering member or shaft that extends along the flow channel and is movable therealong. The shaft has proximal end that extends through the housing of the flow meter and is attached to a locking button that can be moved laterally to pull the shaft along the flow channel during cleaning, and a distal end spaced from the proximal end and generally positioned adjacent the point where the inlet channel connects to the flow channel. A cleaning member is attached to the distal end of the shaft and is movable along the flow tube with the movement of the shaft along the flow channel. The cleaning member generally is a substantially circularly shaped disc or ring of a diameter approximately equal to the diameter of the flow tube. The cleaning member thus tends to engage and scrape the sides of the flow tube as it is moved therealong with the movement of the shaft to clean the flow tube of accumulated dirt and grime. The cleaning member further includes a series of flow openings formed therein to enable free flowing of the fluid therethrough.

A float is mounted on the shaft between the proximal end of the shaft and the cleaning member and includes a flow opening formed approximately through its center and through which the shaft extends and through which the fluid medium flows. The float is movable along the shaft in response to the flow of the fluid medium through the flow channel to indicate the rate of flow of the fluid medium through the flow channel, as shown by the scale printed on the flow tube. A spring is positioned between the movable float and the housing at the end of the flow tube adjacent the outlet channel. The spring biases the float toward the distal end of the shaft, urging the float against the force of the flow of the fluid medium through the flow tube.

A sensor is mounted to the housing, positioned above the flow channel adjacent the flow tube. The sensor generally is an inductive sensor that detects the presence of the float positioned therebelow, which is indicative of a proper operation and normal flow of fluid through the flow meter. Should the flow of the fluid through the flow meter be disrupted, and the float thus moved toward the distal end of the shaft and from beneath the sensor, the sensor, will signal an alarm and shut down the system.

The cleaning function of the flow meter is carried out by the scraping motion of the float and cleaning member with the side wall of the flow tube as the shaft is pulled along the length of the flow channel. The scraping movement of the float and cleaning member effectively removes accumulated dirt and grime from the flow tube to clean the flow tube and maintain the flow tube in proper working operation. Further, the cleaning function is carried out without a disruption in the flow of the fluid medium through the flow channel. Instead, the fluid medium continues to flow through the flow openings of the cleaning ring and the flow opening through the float. The continued flow of the fluid medium through the flow channel also assists in washing away collected dirt and debris scraped from the side wall of the flow tube. As a result, the flow tube of the flow meter is quickly and effectively cleaned by the cleaning assembly without a disruption in the flow of the fluid medium therethrough.

Various objects, advantages and features of the present invention will become apparent to those skilled in the art upon reading the following detailed description when viewed in conjunction with the accompanying drawings.

BRIEF DESCRIPTION OF THE DRAWINGS

FIG. 2 is a side elevational view of the flow meter taken in cross-section, showing the path of flow of liquid through the flow meter.

FIG. 3 is a perspective view or the flow indicating and cleaning assembly.

DETAILED DESCRIPTION OF THE PREFERRED EMBODIMENT

Figure 1:
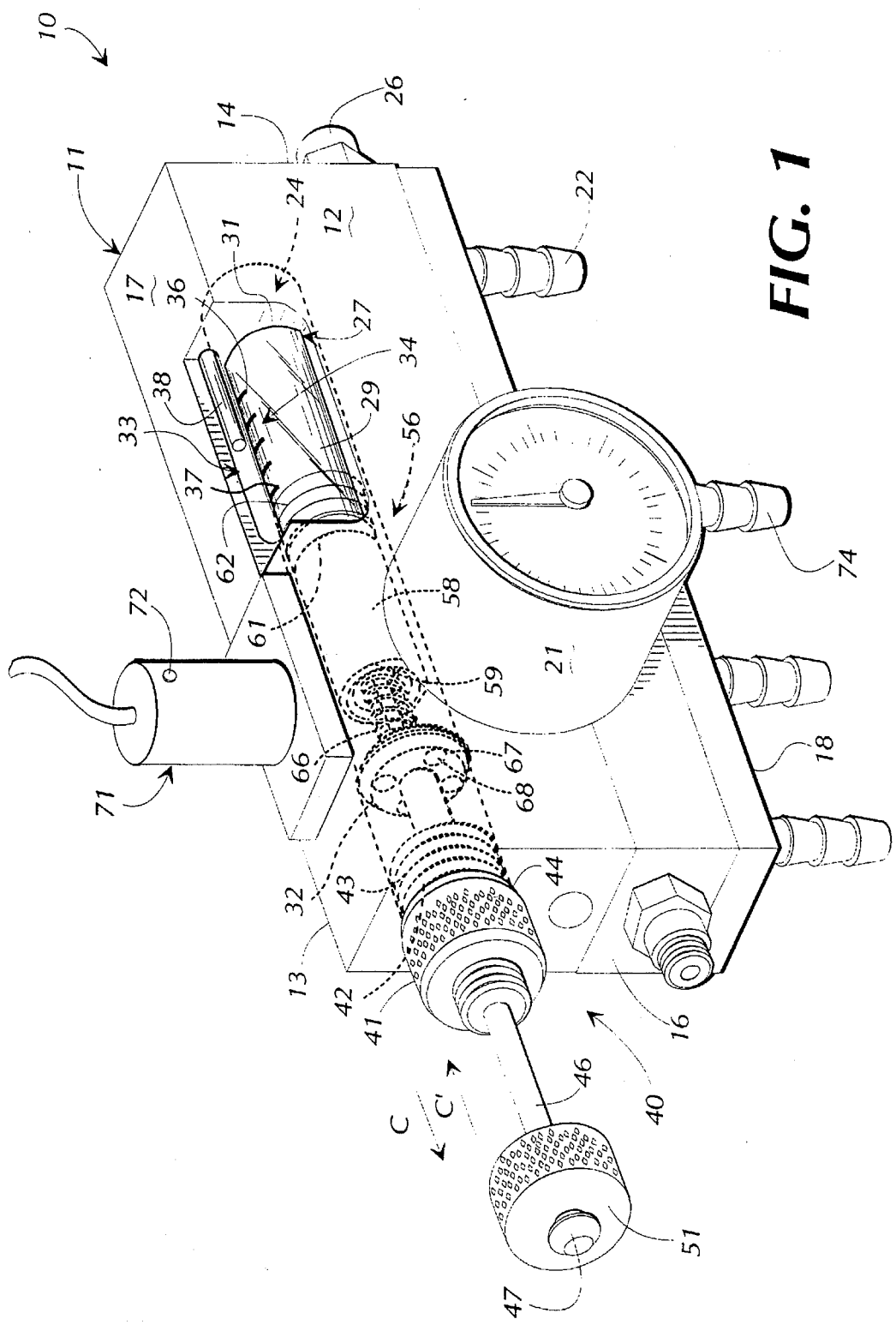
FIG. 1 is a perspective view of the flow meter with the flow indicating and cleaning assembly thereof shown in dashed lines.

Referring now in greater detail to the drawings in which like numerals indicate like parts throughout the several views, FIG. 1 illustrates a flow meter 10 for measuring the rate of flow of a fluid cooling and lubricating medium (not shown), such as water, oil, etc. about the bearing seal of a conventional flow pump. The flow meter 10 includes a substantially rectangular housing 11. The housing 11 is typically constructed from a durable high-strength material such as TEFLON® or a similar hard plastic that has a high chemical and thermal resistance to withstand harsh working conditions such as, for example, in a paper mill. The housing includes a front 12, rear 13, a first side edge 14, a second side edge 16, top 17 and bottom 18.

As shown in FIG. 1, a pressure gauge 21 is mounted to the front 12 of the housing 11. The pressure gauge 21, which is of conventional construction, measures the pressure of the fluid (not shown) flowing through the flow meter 10 in both pounds per square inch (psi) and Mega-Pascals. An inlet pipe connector 22 is affixed to the bottom 18 of the housing 11 adjacent the first side edge 14 and extends downwardly from the bottom 18. The inlet pipe connector 22 connects a flow inlet pipe (not shown) for the fluid to an inlet channel 23 (FIG. 2). As FIG. 2 illustrates, the inlet channel 23 extends upwardly through the housing 11, adjacent and parallel to side edge 14 and connects to a horizontally aligned flow channel 24. The flow channel 24 extends longitudinally through the housing from the first side edge 14 to the second side edge 16 of the housing and defines a substantially cylindrical passage from the flow of the fluid through the housing as indicated by Arrows A.

A flow regulation valve 26 is mounted along the first side edge 14 of the housing 11 and extends partially through the housing into communication with the flow channel 24 and inlet channel 23. The flow regulation valve 26 can be manipulated through the use of a key (not shown) inserted into the end of the flow regulation valve 26 and rotated so as to close or open the passage between the inlet channel 23 and the flow channel 24 to restrict or increase the flow of the fluid passing from the inlet channel 23 into the flow channel 24. Thus, the amount of fluid in the flow channel 24 can be adjusted quickly and easily as required.

A flow tube 27 is positioned in line with the flow channel 24, extending partially along the length of the flow channel in the path of flow of the fluid through the housing. As shown in FIGS. 1 and 2, flow tube 27 is a generally cylindrical member formed from a clear, transparent plastic or glass and has an inner wall 28, an outer side wall 29 and first and second open ends 31 and 32. As shown in FIG. 1, a cutaway portion 33 is formed in the top 17 and front 12 of the housing 11, exposing a portion of the flow tube to visual inspection. A scale 34 is printed on the portion of the outer sidewall 29 of the flow tube 27, exposed by the cutaway 33 and provides a standard for measuring the rate of fluid flow through the flow meter 10. The scale 34 has a zero point 36 and includes a series of indicator marks 37 spaced equidistantly from one another to indicate the rate of flow of the fluid medium in, for example, gallons per minute. It also should be understood that an additional, separate scale can be provided that measures the flow rate of the fluid flow in, for example, liters per minute. If a different scale is needed, the flow tube 27 simply can be rotated to bring the desired scale into view.

As shown in FIGS. 1 and 2, a set point indicator 38 is positioned above and extends parallel to the flow tube, aligned with the scale 34. The set point indicator generally is a colored rod or pin mounted to the housing, projecting into the cutaway portion 33 and movable along the length of the flow tube by the engagement of a key (not shown) therewith inserted into the housing as indicated in FIG. 2. The set point indicator can be adjusted to a desired position along the scale to indicate the flow volume desired for the particular operation in which the flow meter is used.

As shown in FIGS. 1 and 2, an indicating and cleaning assembly 40 is removably mountable within the flow channel 24 of the housing 11 of the flow meter 10. The indicating and cleaning assembly is received within and extends along the length of the flow channel 24 and the flow tube 27 and is secured to the housing by a locking bearing 41. The locking bearing 41 generally is a cylindrical plug having a threaded connector portion 42 that mates with threads 43 formed about an opening 44 formed in the housing through which the indicating and cleaning assembly is received.

As shown in FIG. 2 the indicating and cleaning assembly 40 includes a metering member or shaft 46 that extends along the length of the flow channel and flow tube and projects through the locking bearing 41, extending outside of the housing. The shaft 46 includes a proximal end 47 that is maintained outside the housing 11, as shown in FIGS. 1 and 2, and a distal end 48 (FIG. 2) spaced from the proximal end 47 and generally positioned adjacent the first open end 31 of the flow tube 27. The shaft 46 generally is constructed from a rigid, durable material such as plastic and includes a flat 49 formed along one side thereof, extending and tapering inwardly from the distal end 48 thereof toward its proximal end 47. The shaft thus has a substantially semi-circular configuration along the portion thereof at which the flat 49 is formed. The proximal end 47 of the shaft 46 is attached to a locking button 51 (FIGS. 1 and 2) that is threadably connectable to the locking bearing 41 to secure the locking button against the housing of the flow meter during the normal function of the flow meter. As FIGS. 2 and 3 illustrate, a cleaning member 52 is mounted to the distal end 48 of the shaft 46. The cleaning member 52 generally is a substantially circularly shaped disk having a diameter approximately equivalent to the diameter of the inner side wall 28 of the flow tube 27, and includes a gasket or cleaning ring 53 applied about its circumference. The cleaning ring 52 generally is formed from rubber or a similar elastic material and engages the inner side wall of the flow tube in tight frictional contact. Thus, as the cleaning member 51 is moved along the length of the flow tube, the cleaning tube tends to scrape accumulated dirt and debris from the inner side wall of the flow tube. A series of flow openings 54 (FIG. 3) are formed in the cleaning member, spaced from one another. The flow openings 54 enable the fluid to flow substantially unrestricted through the cleaning member and along the flow tube.

A float 56 is mounted on the shaft and is movable therealong between the cleaning member 52 at the distal end 48 of the shaft and the locking bearing 41 adjacent the proximal end 47 of the shaft. The float is a substantially hollow, cylindrical member formed from a metal such as steel or similar material and includes an inner wall 57 (FIG. 3), an outer wall 58, an open end 59, and a substantially closed end 61. An indicator ring 62 is mounted at the closed end 61 of the float and generally is formed from a rigid, durable plastic material. As shown in FIG. 1, the indicator ring 62 functions as a means for indicating the rate of flow of the fluid through the flow meter by its position along the scale 34 applied to the flow tube 27. Further, the position of the indicator ring along the scale in relation to the set point indicator 38 provides a quick visual indication as to whether the desired level of a fluid flow through the flow meter is achieved. The indicator ring 62 and the float 56 have a diameter approximately equivalent to the diameter of the inner side wall 28 (FIG. 2) of the flow tube and engage the inner side wall of the flow tube in scraping contact so as to scrape and clean accumulated dirt and grime from the inner side wall of the flow tube during a cleaning operation. As shown in FIGS. 3 and 4, an aperture or flow opening 63 is formed in the closed end 61 of the float 56. The shaft 46 extends through the aperture 63 to support the float 56. The area between the aperture 63 and the flat portion 49 along metering member 46 forms a variable area flow space 64 through which the system fluid flows as it passes through the flow tube 27.

A compression spring 66 is positioned within the confines of the inner wall 57 of the float 56, and bears against the closed end 61 of the float 56 through the open end 59 of the float and is affixed to a stop 67 positioned adjacent the second end 37 of the flow tube 27. As FIG. 2 indicates, the spring 66 functions as a means for biasing the float along the length of the flow tube 27 in the direction of Arrows B, toward the first end 31 of the flow tube 27. As shown in FIG. 3, the stop is a generally cylindrically shaped disk formed from rubber or a plastic material and having a series of flow openings 68 therethrough. The stop 67 acts as a bearing surface against which the spring is compressed by the flow of the fluid against the float.

As shown in FIGS. 1 and 2, a sensor 71 is mounted to the housing 11 of the flow meter 10, aligned with the flow channel 24. The sensor generally is an inductive sensor that reads the presence of the metal float 56 thereunder, although other types of conventional sensors capable of detecting the presence or absence of the float 56 likewise can be used. The sensor is linked to the control system for the process to notify the control system if an emergency or problem arises. An indicator such as an LED or light 72 is mounted to the sensor and provides an immediate visual indication of the existence of a problem such as a low flow condition. During normal operation of the flow meter, a portion of the float 56 generally is positioned beneath the sensor 71, as shown in FIG. 2, and the LED indicator 72 remains unlit indicating a normal operating condition. If the flow becomes disrupted, and the float means moves out from beneath the sensor 71, the sensor is triggered indicating a low flow or emergency condition under which condition the LED indicator flashes indicating an emergency, and the control system for the monitoring and regulating system is notified, potentially shutting the system down.

As shown in FIG. 2, an outlet channel 73 is formed in the housing 11 and extends from the flow channel adjacent the second end 32 of the flow tube 27 downwardly through the housing to an outlet pipe connector 74 shown in FIG. 1. The outlet channel 73 enables the sealing water to exit the housing. The outlet pipe connector 74 attaches to an outlet flow pipe (not shown) which delivers the fluid, such as sealing water, to the pump seal (not shown).

In operation of the flow meter 10 (FIG. 1), in a fluid flow monitoring and regulating system, the flow meter is installed along the fluid delivery line for the system, such as along the line for the delivery of sealing water to a pump seal, and the set point indicator 38 is adjusted to a desired flow volume set point. A fluid flow (not shown) is delivered to the flow meter 10 through an inlet flow pipe (not shown) connected to inlet pipe connector 22. The fluid flows into the inlet channel 23 (FIG. 2) in the direction of Arrows A and passes upwardly to the flow channel 24. The fluid flow is regulated by the adjustment of regulation valve 26 which opens up or closes off the inlet channel 23 to adjust the flow of fluid into the flow meter.

The fluid flows against the float 56, urging the float along the flow tube in the direction of Arrows A and against the spring 66. The float is urged in the direction of Arrows A until the force of the flow through the aperture 63 of the float is equalized by the force of the spring 66 urging the float in the direction of Arrow B against the force of the fluid flow. The position of the indicator ring 62 mounted to the float can be read through the transparent flow tube and, by its position along the scale, indicates the rate of the flow of fluid through the flow meter. The flow then is adjusted by manipulation of the regulation valve to match the desired set point and the system is started.

As indicated in FIG. 1, once enough dirt and debris has accumulated within the flow tube 27 to necessitate cleaning, the locking button 51 is unscrewed or otherwise unsecured from the locking bearing 41 and is pulled outwardly from the housing in the direction of Arrow C. As the locking button is pulled outwardly in the direction of Arrow C, the shaft 46 correspondingly is moved along the length of the flow channel in the direction of the flow of fluid therethrough. The movement of the shaft along the flow channel causes the cleaning member 52 and float 56 likewise to be moved along the length of the flow channel in the direction of Arrows A. The tight frictional contact of the cleaning ring 53 of the cleaning member 52 and the indicator ring 62 of the float 56 with the inner side wall 28 of the float tube 27, causes the cleaning ring 52 of the cleaning member and the indicator ring 62 to engage and scrape the surface of the inner side wall of the flow tube so as to scrape and remove any accumulated dirt and grime from the inner side wall of the flow tube. This scraping operation is repeated as the locking button is released and the cleaning member and float are returned to their normal operating positions. As a result, the dirt and debris that is accumulated along the inner side wall of the float tube effectively is removed by the scraping action of the cleaning ring of the cleaning member and the indicator ring of the float so as to effectively clean the entire length of the flow tube so that the float tube remains clear and unobstructed.

During a cleaning operation, the flow of fluid through the flow channel of the flow meter remains uninterrupted. Instead, the fluid continues to flow through the flow openings 54 of the cleaning member and through the aperture or flow opening 63 of the float 56. The force of the flow of fluid flow further tends to maintain the spacing between the cleaning member and the float so as to ensure that the flow of fluid will remain substantially uninterrupted and that the float will return to its flow indicating position quickly and without requiring additional readjustment. Further, the float remains positioned beneath the alarm sensor mounted to the housing of the flow meter so that the sensor is not inadvertently triggered during the cleaning operation. Instead, the flow tube is substantially cleaned of all accumulated dirt and debris in a quick and simple cleaning operation while at the same time the flow of fluid through the flow meter is maintained relatively constant. Accordingly, the cleaning of the flow meter of the present invention is quickly and easily accomplished without causing a disruption in the flow of sealing or cooling fluid to the seal of a pump or similar device, and which further does not falsely trigger the alarm system for the cooling and water monitoring system resulting in the entire shut down of the system.

Once the flow tube has substantially been cleaned of all the accumulated dirt and grime therein, the locking button 51 is released and returned in the direction of Arrow C' by the pressure of the spring 66 of the indicating and cleaning assembly 40. As a result, the float and indicator ring 62 are returned to their flow indicating position along the scale of the flow tube while the continued flow of fluid through the flow tube washes the removed dirt and debris out of the outlet channel 73 to complete the cleaning of the flow meter 10.

Although this invention has been described in detail in a preferred embodiment, it will be understood by those skilled in the art that numerous changes and modifications may be made thereto without departing from the spirit and scope of the invention as set forth in the following claims.

I claim:

1. A variable area flow meter for measuring the rate of flow of fluid through a system, comprising:

a housing including a flow channel formed therethrough having an inlet and an outlet;

a flow tube mounted in said housing along said flow channel and having an inner side wall, a first open end, and a second open end; and an indicating and cleaning assembly received within said flow channel, extending along said flow tube for cleaning said flow tube of accumulated dirt and debris without disrupting the flow of fluid through said flow channel, said assembly comprising a longitudinally extending shaft movable along said flow channel and having a proximal end and a distal end, a cleaning member mounted to said distal end of said shaft in engagement with said inner side wall of said flow tube, movable with said shaft along said flow tube for cleaning said flow tube and having a series of flow openings to enable the fluid to flow therethrough, and a float mounted on said shaft between said proximal and distal ends and movable therealong in response to the flow of fluid through said flow tube to indicate the rate of flow of the fluid, said float having an aperture formed therein to enable the fluid to flow through said float and thus to flow substantially uninterrupted through said flow tube and being movable with said shaft during a cleaning operation for cleaning said flow tube;

whereby during cleaning of said flow tube of accumulated dirt and debris, said flow indicating and cleaning assembly is moved along said flow tube toward said second end thereof, causing said cleaning member to scrape along said inner side wall of said flow tube as the fluid continues to float through said flow tube without interruption to remove the accumulated dirt and debris therefrom to clean said flow tube substantially completely without disrupting the flow of fluid through said flow channel.

2. The flow meter of claim 1 and further including a means for detecting a decrease in the flow of fluid through said flow channel, mounted along said flow channel adjacent said flow tube.

3. The flow meter of claim 2 and wherein said means for detecting comprises a sensor mounted to said housing in a position to detect the absence of said float therebelow, which is indicative of a disruption of the flow of fluid through said flow channel.

4. The flow meter of claim 1 and further comprising a scale indicative of the rate of flow of the fluid positioned along a portion of said flow tube to enable a visual perception of the rate of flow of the fluid based upon the position of said float therealong.

5. The flow meter of claim 1 and further including a means for biasing said float toward said first end of said flow tube and against the flow of fluid, mounted between said float and said proximal end of said shaft.

6. The flow meter of claim 4 and further including an indicator ring mounted to said float opposite said means for biasing and movable with said float for indicating the rate of flow of the fluid on said scale.

7. The flow meter of claim 1 and wherein said shaft comprises a substantially cylindrically shaped rod having a flat formed adjacent its distal end, and which tapers toward said proximal end to form a semicylindrically shaped portion such that as the fluid flows against said float, said aperture is opened and narrowed to regulate the flow of fluid through said aperture to an equilibrium point.

8. A variable area flow meter for measuring the rate of flow of a fluid, comprising:

a housing;

a flow tube mounted within said housing and having an inner side wall defining a flow passage through which the fluid flows;

a metering member slidably mounted to said housing, extending along said flow passage through said flow tube and including a proximal end and a distal end;

a cleaning member mounted to said distal end of said metering member and through which the fluid flows, said cleaning member movable along said flow tube with the sliding movement of said metering member such that as said metering member is moved through said housing, said cleaning member is moved and engages said inner side wall of said flow tube for cleaning said flow tube of accumulated dirt; and a float supported on said metering member, positioned between said proximal and distal ends, movable therealong in response to the flow of fluid through said flow tube to indicate the rate of flow of the fluid through the flow meter by its position along said flow tube and having a flow aperture formed therethrough through which said metering member extends and through which the fluid flows, said float further movable with the movement of said metering member so as to be spaced from said cleaning member during a cleaning operation to ensure its flow aperture is open for the substantially uninterrupted flow of fluid through said flow passage;

whereby when dirt and grime has accumulated within said flow tube sufficiently to require cleaning of the flow meter, said metering member is moved along said flow passage, causing said cleaning member to move along said flow tube in scraping engagement with said inner side wall of said flow tube while the fluid continues to flow tube through said cleaning member and said float to remove the accumulated dirt and grime therefrom, without substantially disrupting the flow of fluid through said flow tube of said flow meter.

9. The flow meter of claim 8 and further including a means for biasing said float along said metering member against the flow of fluid to regulate the position of said float along said flow tube.

10. The flow meter of claim 9 and wherein said means for biasing comprises a compression spring positioned downstream from said float between said float and a side wall of said housing.

11. The flow meter of claim 8 and further including a scale applied along said flow tube for indicating the rate of flow of the fluid by the position of said float along said flow tube in relation to said scale.

12. The flow meter of claim 11 and further including an indicator ring mounted to said float and movable with said float for indicating the rate of flow of the fluid on said scale.

13. The flow meter of claim 8 and wherein said cleaning member further comprises a series of flow openings formed through said cleaning member to enable the fluid to flow therethrough so that the fluid flow through the flow meter is not disrupted.

14. The flow meter of claim 8 and further including a means for detecting a decrease in the flow of fluid through said flow channel, mounted along said flow channel adjacent said flow tube, said means for detecting comprising a sensor mounted to said housing in a position to detect the absence of said float therebelow, which is indicative of a disruption of the flow of fluid through said flow channel.

* * * * *